(12) United States Patent
Fram

(10) Patent No.: US 8,273,286 B2
(45) Date of Patent: Sep. 25, 2012

(54) POSITIVE PRESSURE SHEAR IMPREGNATOR AND WETOUT

(76) Inventor: Jerry R. Fram, Los Angeles, CA (US)

( * ) Notice: Subject to any disclaimer, the term of this patent is extended or adjusted under 35 U.S.C. 154(b) by 909 days.

(21) Appl. No.: 12/208,322

(22) Filed: Sep. 10, 2008

(65) Prior Publication Data

US 2009/0065130 A1  Mar. 12, 2009

Related U.S. Application Data

(60) Provisional application No. 60/971,169, filed on Sep. 10, 2007.

(51) Int. Cl.
*B29C 47/00* (2006.01)
(52) U.S. Cl. ......... 264/510; 156/500; 156/501; 264/299
(58) Field of Classification Search .......... 156/500, 156/501; 264/510, 175, 500, 299; 366/72; 69/71, 73, 74, 76.5; 52/470, 471, 777–781
See application file for complete search history.

(56) References Cited

U.S. PATENT DOCUMENTS

| | | | |
|---|---|---|---|
| 3,738,895 A * | 6/1973 | Paymal | 156/443 |
| 3,932,980 A | 1/1976 | Mizutani et al. | |
| 4,137,023 A * | 1/1979 | Moked et al. | 418/15 |
| 4,366,017 A | 12/1982 | Siri | |
| 4,889,429 A * | 12/1989 | Heinzmann et al. | 366/71 |
| 5,205,898 A | 4/1993 | Wilson et al. | |
| 5,569,348 A * | 10/1996 | Hefele | 156/239 |
| 5,620,769 A | 4/1997 | Wessels et al. | |
| 6,540,863 B2 | 4/2003 | Kenney et al. | |
| 6,663,733 B2 | 12/2003 | Nagaya et al. | |
| 6,854,499 B2 | 2/2005 | Miller | |
| 7,238,251 B1 | 7/2007 | Driver et al. | |
| 7,955,544 B2 * | 6/2011 | Contreras | 264/284 |
| 8,152,958 B2 * | 4/2012 | Super et al. | 162/111 |
| 2002/0089098 A1 | 7/2002 | Nagaya et al. | |
| 2003/0102069 A1 | 6/2003 | Miller | |
| 2005/0126690 A1 | 6/2005 | Miller | |
| 2006/0130753 A1 | 6/2006 | Driver et al. | |
| 2007/0204952 A1 | 9/2007 | Driver et al. | |
| 2008/0083519 A1 * | 4/2008 | Kokko et al. | 162/9 |
| 2008/0245492 A1 * | 10/2008 | Edwards et al. | 162/111 |
| 2010/0006249 A1 * | 1/2010 | Kokko et al. | 162/111 |
| 2010/0224338 A1 * | 9/2010 | Harper et al. | 162/132 |
| 2010/0326616 A1 * | 12/2010 | Klerelid et al. | 162/205 |

* cited by examiner

*Primary Examiner* — Joseph Del Sole
*Assistant Examiner* — Nahida Sultana
(74) *Attorney, Agent, or Firm* — Canady & Lortz LLP; Bradley K. Lortz

(57) ABSTRACT

Systems and methods are described where at least one roller (e.g., a kicker roller) is used to impregnate fibers (i.e., a charge or reinforcement) with a liquid resin (i.e., matrix) by eliminating air from the resin and fibers as they enter a pressurized zone. Air is forced out as the resin is first drawn into an entry zone of the roller, then into an entry gap adjacent to the roller, and then into the pressurized zone on the opposite side of the roller. The pressurized zone is an enclosed area at the output side of the roller where the resin is allowed to accumulate and the resin and composite combination are then forced out through a small exit gap. Shear forces between the surface of the quickly rotating driven roller and the resin provide the driving force. The fibers may be continuous (e.g., from a roller) or discontinuous or loose cut.

10 Claims, 17 Drawing Sheets

POSITIVE PRESSURE SHEAR IMPREGNATOR AND WETOUT

CROSS-REFERENCE TO RELATED APPLICATIONS

This application claims the benefit under 35 U.S.C. §119 (e) of the following U.S. provisional patent application, which is incorporated by reference herein:

U.S. Provisional Patent Application No. 60/971,169, filed Sep. 10, 2007, and entitled "POSITIVE PRESSURE SHEAR IMPREGNATOR AND WETOUT SYSTEM", by Jerry R. Fram.

BACKGROUND OF THE INVENTION

1. Field of the Invention

This invention relates to composite manufacturing. Particularly, this invention relates to techniques for impregnating composite fibers with viscous resins.

2. Description of the Related Art

Some existing techniques for de-gassing viscous curable fluids in manufacturing, e.g. as may be used in composite manufacturing, employ a vacuum or a centrifuge, or a combination of the two. The vacuum process has the disadvantage of boiling off important solvents from the liquid as air is removed. Elimination of such solvents creates extra expense, and the solvents may be needed in the liquid resin. For example, styrene is a solvent in thermosetting polyester resin that becomes part of the resin when it is cross linked. On the other hand, a centrifuge does not boil off solvents, but centrifuge equipment is expensive even in its simple form, such as for batch processing. Some known techniques of composite impregnation can be described.

A first technique for composite impregnation involves dipping the fibers in a bath and squeezing out the excess through a bushing or calendering rolls. This first technique is used for pultrusion, filament winding, and prepreg manufacturing, and certainly many other processes.

A second technique for composite impregnation involves allowing the fibers to settle into the liquid over time. This second technique is used in fiber reinforced plastic (FRP) panel manufacture. For FRP panel manufacture, a liquid, typically polyester resin, is metered onto a carrier film in a thin layer, and chopped fibers are dropped onto it and/or a fiberglass mat is dispensed into it. The film with resin and fiberglass is dragged over a long heated bed, where the fibers and/or fiberglass mat settle into the resin layer and are wet out by it. At the end of the heated bed, a top film is pressed onto it with nip rolls and excess resin is squeezed out. A similar third technique, also used in FRP panel manufacture, involves fibers being gently pushed into the resin with grooved or mesh surfaced rolls in contact with the materials.

A fourth technique for composite impregnation involves mechanically forcing the fibers into the liquid resin. For example, this technique is used for manufacturing prepregs with continuous fibers and hot-melt resin. In it, a release paper is coated with hot-melt resin, and a thin row of fibers is brought in with an opposing release paper and pressed into the resin-coated lower paper. Precision-ground heated rollers are used in this process, and the material is usually worked several times with these rolls to achieve wetout and B-Staging, a preliminary curing stage. Production speed is slow.

A fifth technique for composite impregnation involves working the resin material between two plastic sheets under pressure with grooved rollers or with a dual-wire-mesh compaction device. This technique is used to make sheet molding compound (SMC). An example dual-wire-mesh compaction device conveys the resin material under pressure in a serpentine path under and over processing rollers to wet out the material.

A sixth technique for composite impregnation is used in TMC Manufacture or Heinzmann technology. Examples of these processes are described in U.S. Pat. No. 3,932,980 to Mizutani and U.S. Pat. No. 4,889,429 to Heinzmann, and are used to make materials very much like SMC. These methods use rotating cylinders to bring the resin matrix and the charge together and impregnate them in a gap between the rotating cylinders. These techniques scrape or fling off the composite from the wetout rollers.

None of the existing techniques for composite impregnation differentially exclude air with positive pressure applied to a resin matrix.

In view of the foregoing, there is a need in the art for apparatuses and methods for efficiently excluding air from a resin in composite manufacturing. In addition, there is a need for such apparatuses and methods to operate with more viscous resins. There is also a need for such apparatuses and methods to provide the option of eliminating a carrier film (such as used in the sixth method, described above) to reduce production costs. There is further a need for such systems and apparatuses to be cheaper and operate at higher production rates than existing systems. These and other needs are met by the present invention as detailed hereafter.

SUMMARY OF THE INVENTION

Systems and methods are described where at least one roller (e.g., a kicker roller) is used to impregnate fibers (i.e., a charge or reinforcement) with a liquid resin (i.e., matrix) by eliminating air from the resin and fibers as they enter a pressurized zone. Air is forced out as the resin is first drawn into an entry zone of the roller, then into an entry gap adjacent to the roller, and then into the pressurized zone on the opposite side of the roller. The resin matrix should be viscous; these shear forces are the defining characteristic of such a viscous resin matrix. The pressurized zone is an enclosed area at the output side of the roller where the resin is allowed to accumulate and the resin and composite combination are then forced out through a small exit gap. Shear forces between the surface of the quickly rotating driven roller and the resin provide the driving force. The charge transmits and responds to these same shear forces. In contrast with the resin matrix, air has negligible viscosity. Therefore, air is not forced against elevated pressure into the pressure zone, as the resin matrix and charge are, and is thus excluded there from the resulting composite material. The charge may be continuous (e.g., from a roller) or discontinuous or loose cut.

A typical apparatus embodiment of the invention comprises a kicker roller rotated adjacent to an entry gap and having an inlet area and an outlet area, a resin matrix provided to fill the inlet area of kicker roller such that the rotating kicker roller draws the resin matrix into the entry gap and forces the resin matrix into the outlet area, a composite fiber charge added to the resin matrix in the inlet area and drawn into the entry gap by the rotating kicker roller along with the resin matrix, and a pressure zone substantially enclosing the outlet area in order to develop increased pressure on the resin matrix forcing the composite fiber charge impregnated with the resin matrix out an outlet gap. The increased pressure of the resin matrix assists impregnation of the resin matrix into the composite fiber charge and forms a barrier excluding air. The resin matrix may comprise a solid suspension and the composite fiber charge may comprise a continuous composite fiber mat or loose composite fibers. The entry gap may be formed against a carrier roll.

In further embodiments of the invention, the apparatus may include a carrier roller rotated in an opposite direction adjacent to the kicker roller and opposite the entry gap. The carrier roller may be used to draw a bottom carrier material to support the resin matrix as it is drawn into the entry gap, impregnated into the composite fiber charge, and output from the outlet gap. The bottom carrier material may be selected from the group consisting of a film, a foil, a paper and a sheet. In some embodiments, a top carrier material may be drawn into the pressure chamber to cover the resin matrix as it is extruded out the outlet gap supported by the bottom carrier material. The resin matrix is impregnated into the composite fiber charge, and output from the outlet gap supported by the bottom carrier material introduced into the pressure chamber downstream of the kicker roller. The top carrier material may be selected from the group consisting of a film, a foil, a paper and a sheet.

In a similar manner, a typical method embodiment of making a composite material, comprises rotating a kicker roller adjacent to an entry gap, the kicker roller having an inlet area and an outlet area, filling the inlet area of kicker roller with a resin matrix such that the rotating kicker roller draws the resin matrix into the entry gap and forces the resin matrix into the outlet area, adding a composite fiber charge to the resin matrix in the inlet area to be drawn into the entry gap by the rotating kicker roller along with the resin matrix, substantially enclosing the outlet area with a pressure zone in order to develop increased pressure on the resin matrix, forcing the composite fiber charge impregnated with the resin matrix from an outlet gap of the pressure zone. The increased pressure of the resin matrix assists impregnation of the resin matrix into the composite fiber charge and forms a barrier excluding air. Method embodiments of the invention may be further modified consistent with the apparatuses and techniques described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of the invention can implement a positive pressure shear impregnator (PPSI) or kicker de-aeration and wetout system. Embodiments of the invention have applications to almost every machine-based composite manufacturing process and provide potential improvements. Embodiments of the invention also have advantages in providing simple de-gassing of viscous liquids. Embodiments of the invention can operate in an inherently continuous process, and the equipment should be less expensive than existing vaccuum and centrifugal systems. Further, dispensing the liquid in sheet form with some embodiments of the invention can present an advantage for some applications.

Figure 1A:
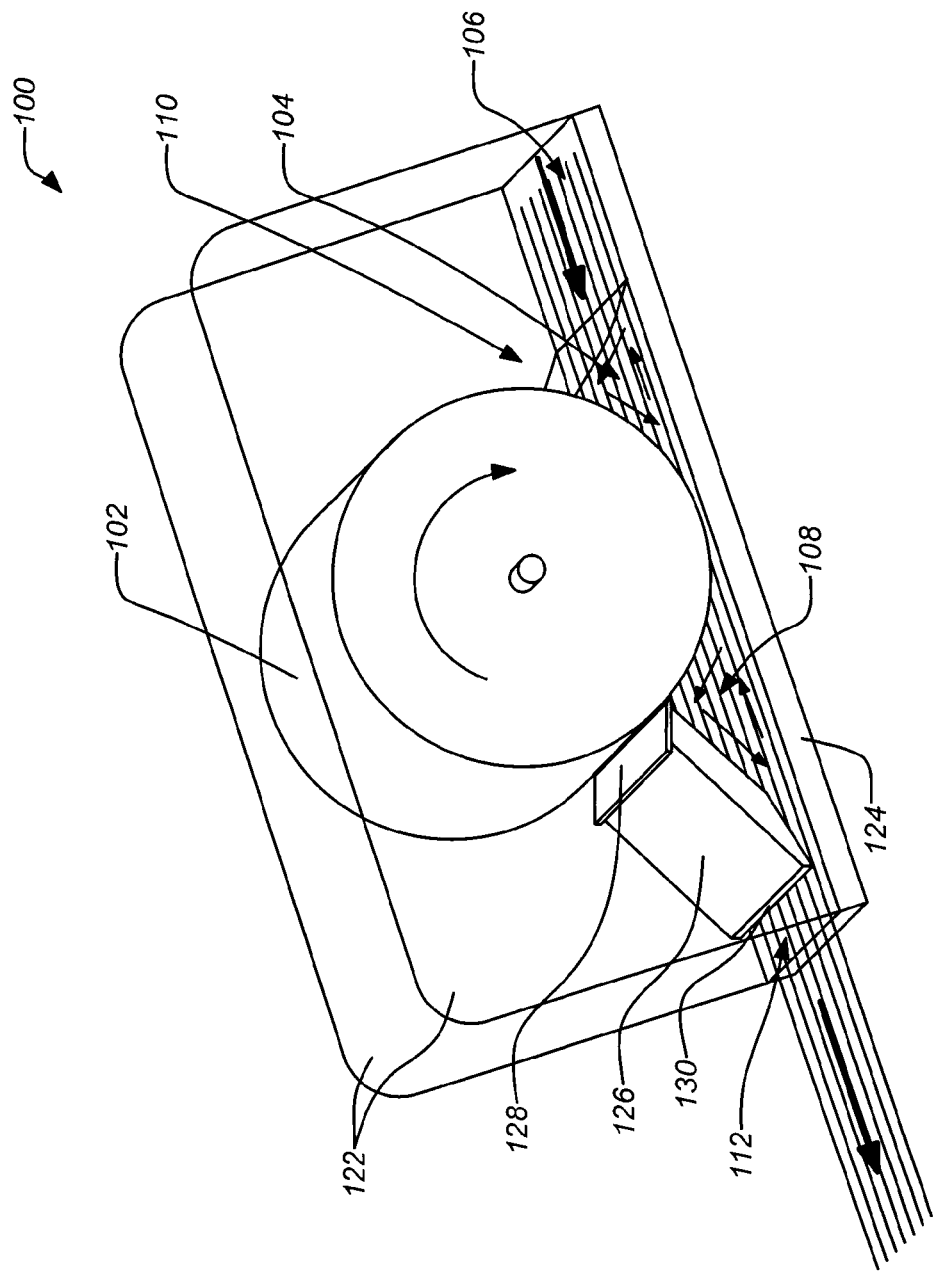
FIGS. 1A & 1B is schematic diagram illustrating a basic example embodiment of the invention employing a single kicker roller.
Figure 1B:
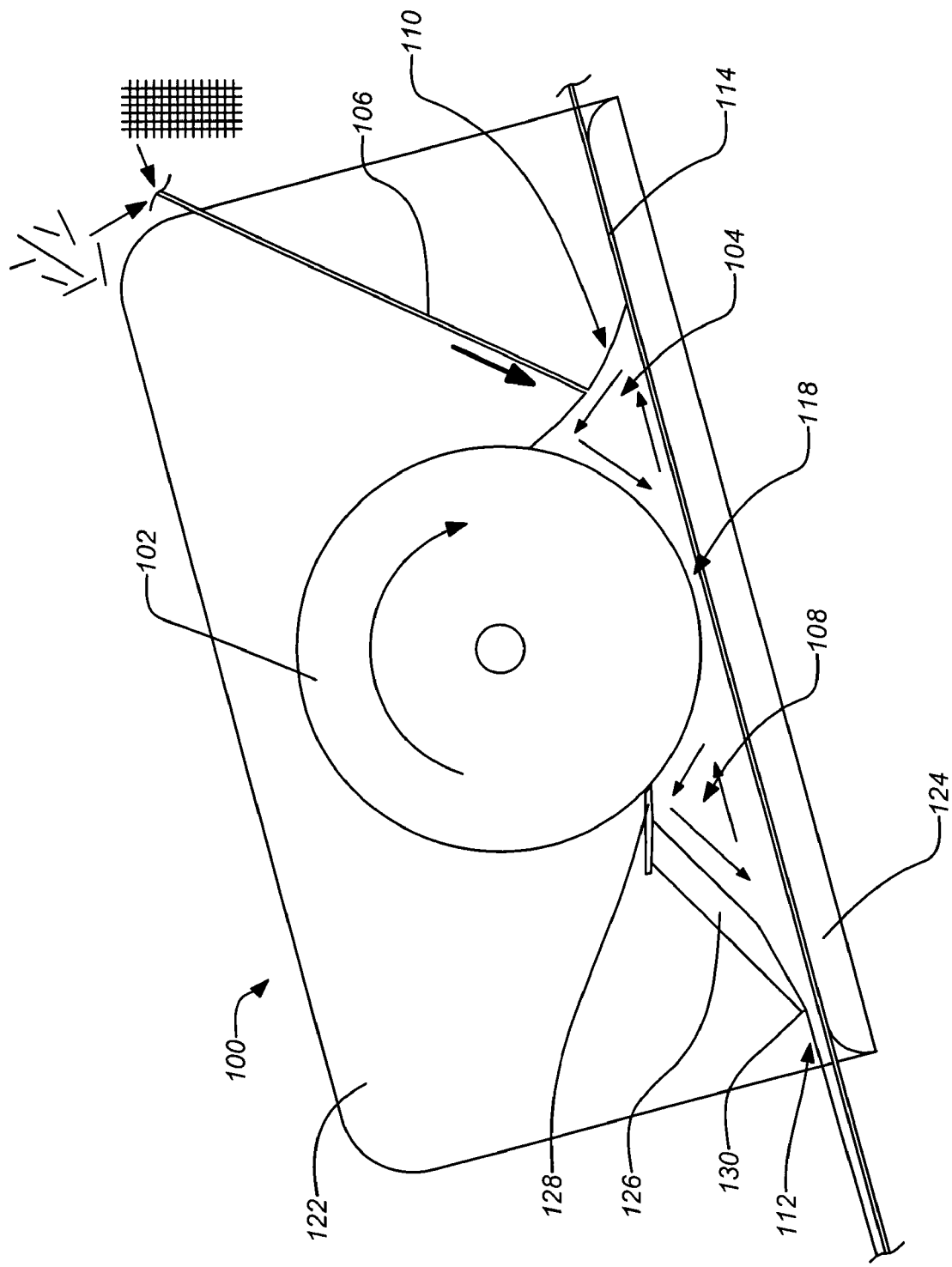

FIGS. 1A & 1B is schematic illustrating a basic example apparatus 100 embodiment of the invention employing a single kicker roller 102. The example apparatus 100 employs a process for de-gassing a viscous liquid, resin matrix 104, which may have solids suspended in it, without the use of a vacuum. The apparatus 100 combines the resin matrix 104 with impregnating fibers (referred to as a charge 106) to produce a substantially gas-free composite material 108, in which the charge 106 is wet out (impregnated) by the resin matrix 104.

The charge 106 may be either continuous or loose fibers. If the charge 106 fibers are continuous, they may pulled into the resin matrix 104 in the inlet area 110, through the entry gap 118 and pressurized zone 108, and out the outlet area 112 where it leaves impregnated with resin matrix 104 as part of the composite. The resin matrix 104 can either be deposited uniformly across the charge 106 fibers as it travels toward the entry gap 118 or it can be injected directly into the pressurized zone 108 or both. If the charge 106 fibers are discontinuous, the resin matrix 104 may be brought into the inlet area 110, uniformly distributed across the width, and the fibers are then dropped uniformly across the resin matrix 104. The charge 106 is drawn in and mixed into the resin in the inlet area 110 and the resin matrix 104 carries the charge 106 through the entry gap 118, the pressurized zone 108, and out the outlet area 112 as part of the composite.

One feature of this process is the use of shear forces selectively to force the resin matrix 104 and charge 106 though an entry gap 118 and into a space of elevated pressure, the pressure zone 108 without also forcing suspended gasses into the pressure zone 108, while providing a path for the suspended gasses to escape. Shear forces work selectively on a resin matrix 104 and charge 106 to de-gas them, because while such shear forces are transmitted through the viscous liquid and solids suspended in it including the charge 106, in comparison, they are negligibly transmitted through gasses trapped within the resin matrix 104, because the viscosity of gases is very small in comparison to the liquids of interest here. The shear forces exerted by the kicker roller can induce a relatively sharp pressure gradient within the resin bringing it from ambient pressure at its exposed surface in the inlet area to an elevated pressure in the entry gap and the pressure zone. The pressure zone is a local zone of elevated pressure. These shear forces also augment the effect of the pressure in the pressure zone, which can be maintained at a positive pressure throughout the process. As a result, gasses trapped in the resin matrix 104, either initially or introduced into it with the charge 106, are excluded from the pressure zone 108, prevented from entering due to its elevated pressure and liberated from the resin matrix 104 in the inlet area 110.

The pressure zone 108 is an enclosed between the entry gap 118 and the outlet area 112 which may be formed by the kicker roller 102, sidewalls 122 (or side dams) of the apparatus against the kicker roller 102, a table 124, and a blade 126. The blade 126 may include wipers 128, 130 against both the kicker roller 102 and the composite forced from the outlet area 112. Appropriate sealing of the pressure zone 108 can be provided by any known technique for providing reasonable hydraulic seals across moving joints. Higher viscosity of the resin matrix 104 may reduce sealing requirements. To allow the resin matrix 104 to pool in the inlet area 110, the apparatus 100 is situated with the inlet area 110 higher than the entry gap 118, e.g. on an incline or even vertically configured. Circulating currents of the resin matrix 104 in both the inlet area 110 and the pressure zone 108 are indicated by the arrows in these regions. These currents draw the air away from the elevated pressure by the entry gap and bring them to the liquid surface where they can escape.

The example apparatus 100 used in this process employs a smooth cylindrical kicker roller 102 surface (rubber and/or metal) that rotates in contact the resin matrix 104, exerting a shear force on it to drag it into a confined space of elevated pressure, the pressure zone 108. The kicker roller 102 is typically driven by an electric motor which may be coupled to the roller through appropriate gearing. (Additional rollers may also be employed in further embodiments described hereafter.) The resin matrix 104 may be forced (extruded) out and also possibly pulled out of the pressure zone 108 (e.g., on a carrier or continuous fiber charge). The charge 106, if any, goes with the resin matrix 104 through the pressure zone 108. If the charge 106 supports tension, it may be used to pull the resulting composite (output charge 106 and resin matrix 104 combined) through the apparatus 100 externally. Alternately, the charge 106 may be carried through the apparatus 100 by the resin matrix 104. In addition, one or two carriers, described hereafter may also be optionally used to bring the components of the composite through the apparatus 100, pulling them out of the pressure zone 108. (In some embodiments, the charge 106 itself may be effectively a fiber top or bottom carrier 114 which is wet out by the resin matrix 104.)

As discussed above, the apparatus may be configured so that an optional bottom carrier, e.g., a flexible carrier such as a film, foil or paper, or a rigid carrier such as sheet metal, can be introduced at the entry zone. The resin can either be metered onto this carrier by doctor blade, reverse roller coater or any other suitable known technique, or injected directly into the pressurized zone or both. The fiber can be deposited onto the bottom carrier or resin upstream of the entry zone. Such a bottom carrier may require additional seals in the device to contain the resin and keep it from spilling over edges of the bottom carrier. The bottom carrier may also be alternatively introduced at the outlet area. In addition, a top carrier may also be introduced at the outlet area either alone or in combination with a bottom carrier. One, but not both of any top and bottom carriers used can be from a rigid material. Furthermore, multiple kicker rollers, staged one after another, may also be used to achieve higher output rates or make more complex fiber reinforced composites.

Optionally, an externally pulled bottom carrier 114—film, foil, paper, or sheet can carry the charge 106 and the resin matrix 104 through the whole apparatus 100. Also, an optional top carrier (not shown) may also be used to join the composite inside the pressure zone 108. Unlike the bottom carrier 114, a top carrier is introduced into the pressure zone 108, e.g. through a narrow slot. Either carrier 114 may be rigid (that is, not bent on the rollers), or flexible, but typically both carriers should not be rigid because at least one of the carriers 114 should bend to create a volume in the pressure zone 108 for the resin matrix 104 and charge 106 as shown in FIG. 1B, for example. A nip roller can be used as one side of the exit gap to reduce drag on the flexible carrier.

Higher pressure of the entry gap and the pressure zone, will reduce the included air. The applied pressure can be increased by reducing the height of the entry gap, increasing the speed of the kicker roller and/or increasing the diameter of the kicker roller. The pressure gradient is in the resin matrix is also a factor in de-gassing, and a higher pressure gradient might be achievable with a lower diameter kicker roller.

Figure 1C:
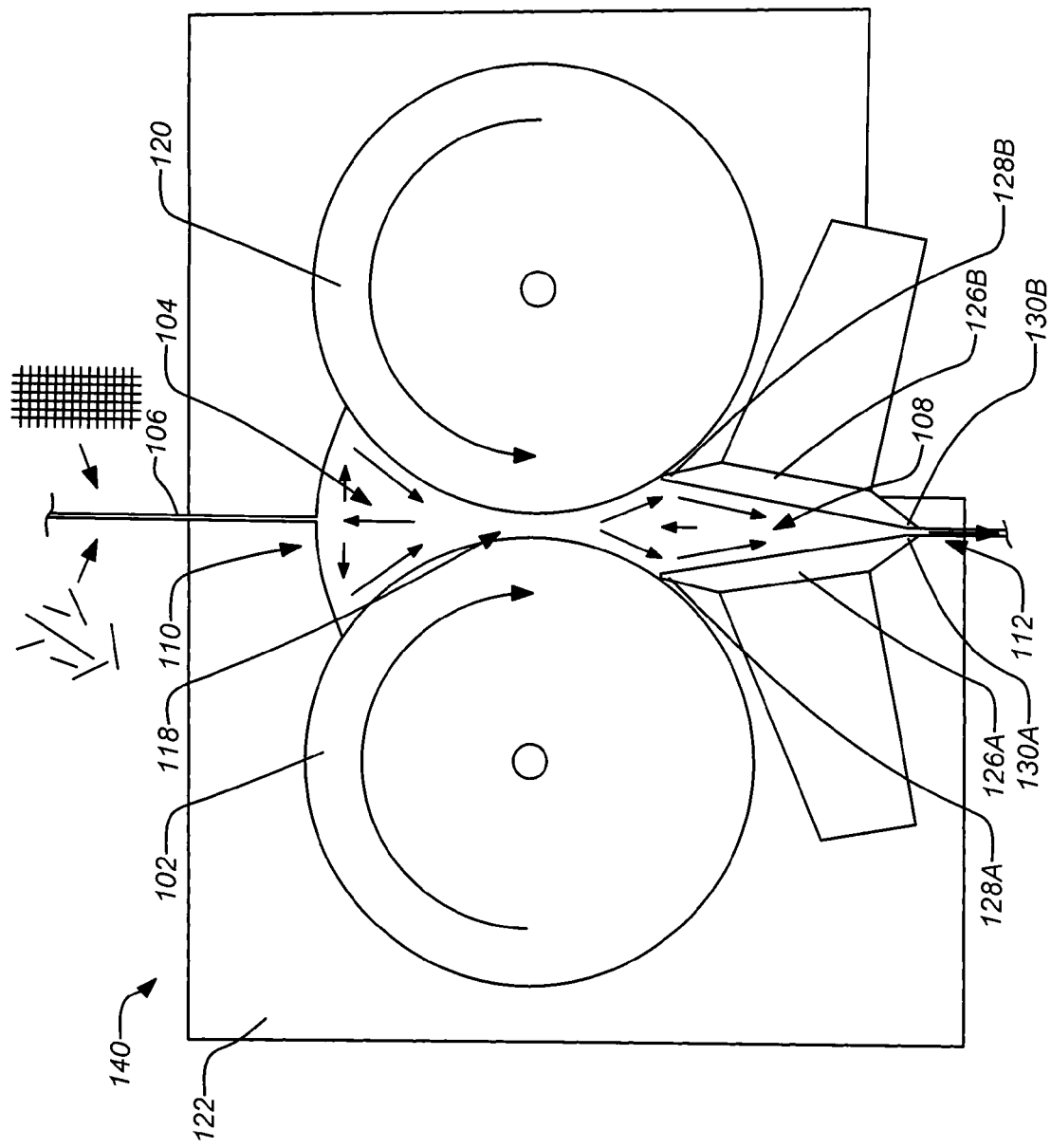
FIG. 1C is schematic diagram illustrating another example embodiment of the invention employing a kicker roller and a carrier roller.

FIG. 1C is schematic diagram illustrating another example apparatus 140 embodiment of the invention employing a kicker roller 102 and a carrier roller 120. (Note that in various embodiments of the invention that do not employ a bottom carrier 114, the the carrier roller 120 may be considered a "second kicker roller." However, for convenience throughout the specification any second kicker roller is referenced as a carrier roller 120 whether or not a bottom carrier 114 is used.) In general, this apparatus 140 operates employing the same principles described with the single roller example apparatus 100 of FIGS. 1A & 1B.

Just as before, an important feature of this process is the use of shear forces selectively to force the resin matrix 104 and charge 106 though an entry gap 118 and into a space of elevated pressure, the pressure zone 108, without also forcing suspended gasses into the pressure zone 108, while providing a path for the suspended gasses to escape. Shear forces from the kicker roller 102 work selectively on a resin matrix 104 and charge 106 to de-gas them, because while such shear forces are transmitted through the viscous liquid and solids suspended in it including the charge 106, in comparison, they are negligibly transmitted through gasses trapped within the resin matrix 104. The shear forces exerted by the kicker roller 102 can induce a relatively sharp pressure gradient within the resin bringing it from ambient pressure at its exposed surface in the inlet area to an elevated pressure in the entry gap and the pressure zone. The pressure zone 108 is a local zone of elevated pressure. These shear forces also augment the effect of the pressure in the pressure zone, which can be maintained at a positive pressure throughout the process. As a result, gasses trapped in the resin matrix 104, either initially or introduced into it with the charge 106, are excluded from the pressure zone 108, prevented from entering due to its elevated pressure and escape from the resin matrix 104 in the inlet area 110. However, in this apparatus 140 the carrier roller 120 (second kiccker roller) rotating in a direction opposite the kicker roller 102, applies additional shear forces to the resin matrix 104 in a symetrical fashion with the kicker roller 102.

As with the apparatus 100 of FIGS. 1A & 1B, here also the charge 106 may be either continuous or loose fibers. If the charge 106 fibers are continuous, they may pulled into the resin matrix 104 in the inlet area 110, through the entry gap 118 and pressurized zone 108, and out the outlet area 112 where it leaves impregnated with resin matrix 104 as part of the composite. The resin matrix 104 can either be deposited uniformly across the charge 106 fibers as it travels toward the entry gap 118 or it can be injected directly into the pressurized zone 108 or both. If the charge 106 fibers are discontinuous, the resin matrix 104 may be brought into the inlet area 110, uniformly distributed across the width, and the fibers are then dropped uniformly across the resin matrix 104. The charge 106 is drawn in and mixed into the resin in the inlet area 110 and the resin matrix 104 carries the charge 106 through the entry gap 118, the pressurized zone 108, and out the outlet area 112 as part of the composite. Virtually all other described features of the apparatus 100 of FIGS. 1A & 1B may be similarly symmetrically applied to the apparatus 140 of FIG. 1C as will be understood by those skilled in the art. For example, a top and/or bottom carrier may also be applied to this apparatus 140 as will be understood by those skilled in the art.

In this apparatus 140, the pressure zone 108 is an enclosed between the entry gap 118 and the outlet area 112 formed by the kicker roller 102, the carrier roller 120, sidewalls (not shown) of the apparatus against the kicker roller 102, and a pair of blades 126A, 126B. The blades 126A, 126B may each include wipers 128A, 128B against the kicker roller 102 and carrier roller 120, respectively, and wipers 130A, 130B agains the composite forced from the outlet area 112. Appropriate sealing of the pressure zone 108 can be provided by any known technique for providing reasonable hydraulic seals across moving joints. Higher viscosity of the resin matrix 104 may reduce sealing requirements. To allow the resin matrix 104 to pool in the inlet area 110, this apparatus 140 is situated with the inlet area 110 directly above the outlet area 112, e.g. vertically configured. Circulating currents of the resin matrix 104 in both the inlet area 110 and the pressure zone 108 are indicated by the arrows in these regions. These currents carry entrapped air away from the elevated pressure of the entry gap up to the surface of the matrix where it can escape.

Those skilled in the art will appreciate that various embodiments of the invention can be made in many different configurations employing a kick roller applied to a resin matrix and charge forced into a pressure zone. Some example configurations for embodiments of the invention are defined in the next section.

2. Apparatus Configurations for Composite Impregnation/Wetout

Nine example configurations for embodiments of the invention for composite impregnation/wetout are itemized in the following table. However, embodiments of the invention are not limited to the described configurations as will be understood by those skilled in the art. For example, additional embodiments of the invention can employ multiple stages (in various ordering) of the described configurations one after another to boost productivity and/or to make composites with multiple layers as will be understood by those skilled in the art.

TABLE OF EXAMPLE IMPREGNATION/WET OUT CONFIGURATIONS

| CONFIGURATION NUMBER | NUMBER OF KICKER ROLLS | BOTTOM CARRIER | TOP CARRIER |
|---|---|---|---|
| 1 | 1 | NONE | NONE |
| 2 | 1 | FLEXIBLE | NONE |
| 3 | 1 | RIGID | NONE |
| 4 | 1 | NONE | FLEXIBLE |
| 5 | 1 | NONE | RIGID |
| 6 | 1 | FLEXIBLE | FLEXIBLE |
| 7 | 1 | RIGID | FLEXIBLE |
| 8 | 1 | FLEXIBLE | RIGID |
| 9 | 2 | NONE | NONE |

The simplest configuration, Configuration 1, employs one kicker roller and does not utilize a carrier as shown in FIGS. 1A-1B. This configuration can be used with a charge that is continuous fiber, e.g., a cloth, or a mat. The resin matrix is a viscous liquid, such as a curable resin, and may include powder, flakes, or other solids in it. Chopped fibers may also be added to the charge in the entry area as described below.

In Configuration 1, to make a uniform composite material, the charge and the resin matrix are dispensed uniformly across the width of the entry area. The kicker roller, which is at least the width of the material entering, rotates in contact with the resin matrix in the entry Area, and forces it through the entry gap, into the pressure zone on the opposite side. The charge goes with the resin matrix into the pressure zone. The kicker roller generates currents and pressure in the resin matrix, which cause the charge to mix into the resin matrix and be impregnated by it to form the output composite. Significant amounts of air or other gasses suspended in the resin matrix are prevented from entering the pressure zone by the elevated pressure therein. The ouput composite, under pressure in the pressure zone, is extruded out of a narrow gap, the outlet area, in sheet form, if that is the form of the charge or if the the outlet area has a low rectangular cross section. It is also possible to pull the composite out as well if it can sustain the tension at this point. If desired, the outlet area can be made so that the composite is not a flat sheet but a sheet with a profile or one with variable thickness or individual fibers.

The pressure zone and inlet area in Configuration 1 includes side walls (side dams) and a slide surface (table) as well as rotary seals on each side of the kicker roller to contain the viscous materials under pressure. Also, a scraper blade (wiper) is mounted on the pressure zone to scrape the surface of the kicker roller sealing the pressure zone. After being extruded from the outet area the composite can be processed further if required or simply packaged.

One example of a composite that can be made with Configuration 1 is epoxy glass prepreg as is used to make electronic circuit board material. In this case, the resin matrix is epoxy resin, which may be heated to make a viscous hot-melt liquid. The charge is fiberglass cloth. The resin matrix here differs from matrices used in current production methods, because the impregnation method is more powerful, and enables the use of pure resins, not thinned by solvents. This epoxy prepreg is currently manufactured using a different process. In the process currently used, the charge is dipped into a bath of resin for impregnation. A viscous resin, such as epoxy hot melt cannot adequately wet the fiberglass cloth in a bath, so the resin must be thinned with solvent for acceptable impregnation, and the solvent then must be boiled off in an oven before the composite is pre-cured or B-Staged in the same oven. The solvent that is boiled off must be either recycled or oxidized to prevent polluting the environment. Embodiments of the invention can make the solvent unnecessary avoiding a great deal of complications and expense inherent in the its use. Also, without solvents to boil off, a copper film can be bonded onto the surface of the prepreg in the same process of forming the prepreg. This bonding can be done using other configurations of the present invention, as described below. In other manufacturing processes in current use, by contrast, the copper is bonded to the surface of the prepreg in a separate operation.

Another example of the use of Configuration 1 is as a technique to wet out continuous fibers for the pultrusion process or filament winding. In the currently used processes of pultrusion and filament winding, continuous fibers are again passed through a bath of resin to impregnate them. Configuration 1 can be used to replace the bath and has the advantage that the resin matrix can have higher filler loading with corresponding lower cost, better properties or both, while still achieving good wetout with elevated viscosity.

Some other example configurations of embodiments of the invention are illustrated in the following section referencing the configuration numbers of the table above. The basic elements of the devices corresond to the elements of Configuration 1 and 9, described above and in reference to FIGS. 1A-1C. which will be understood by those skilled in the art.

3. Example Embodiments of Positive Pressure Shear Impregnator (PPSI)

Figure 2A:
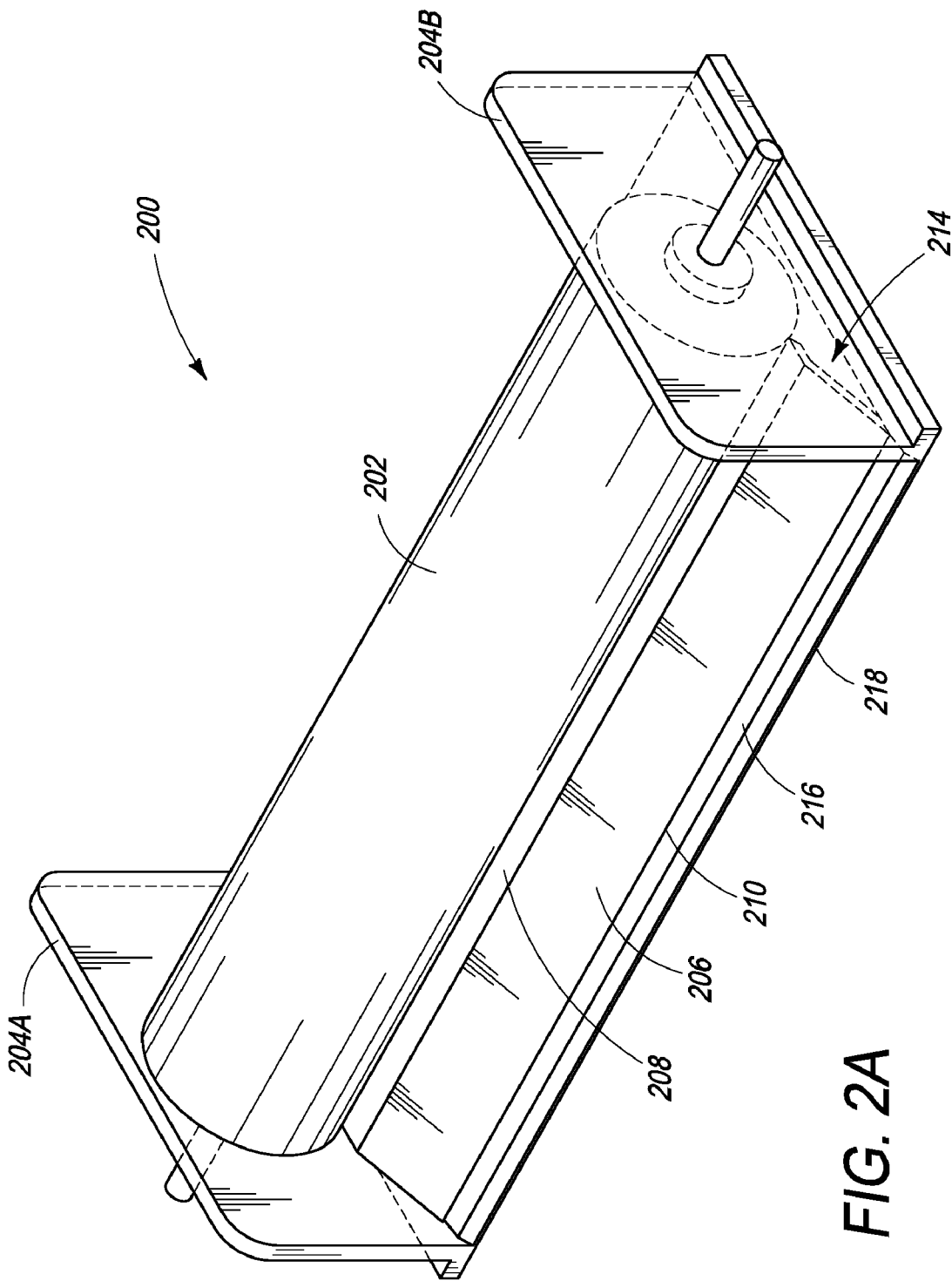
FIGS. 2A-2C illustrates an example embodiment of the invention employing a single kick roller.
Figure 2B:
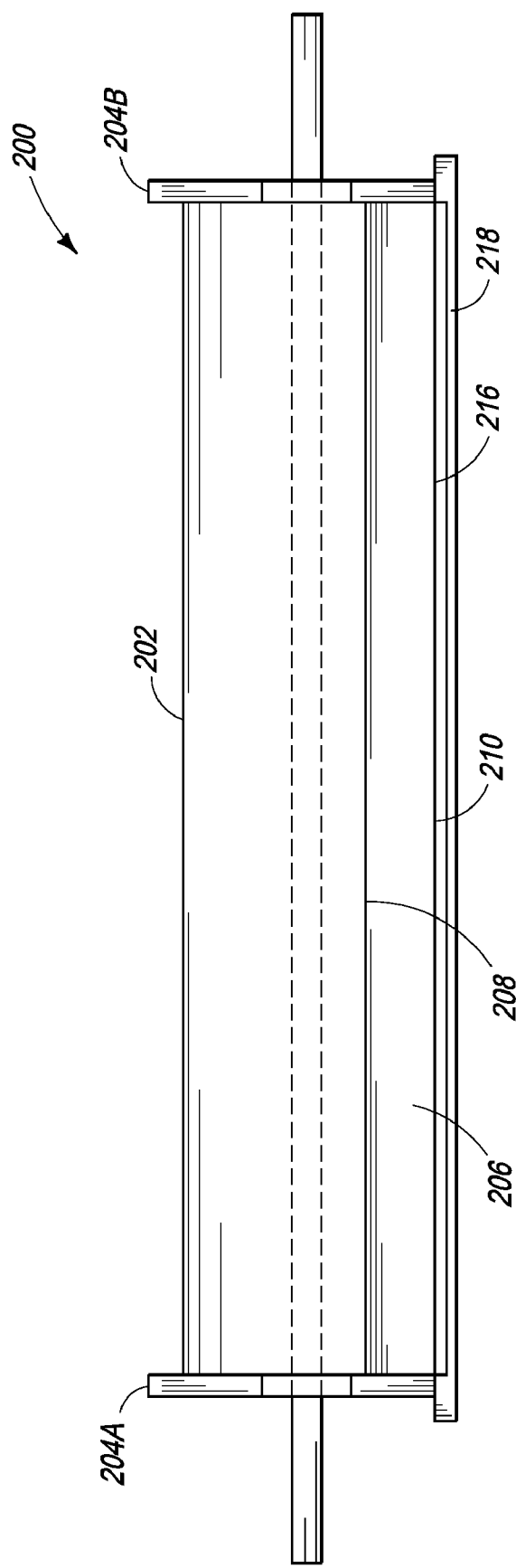
Figure 2C:
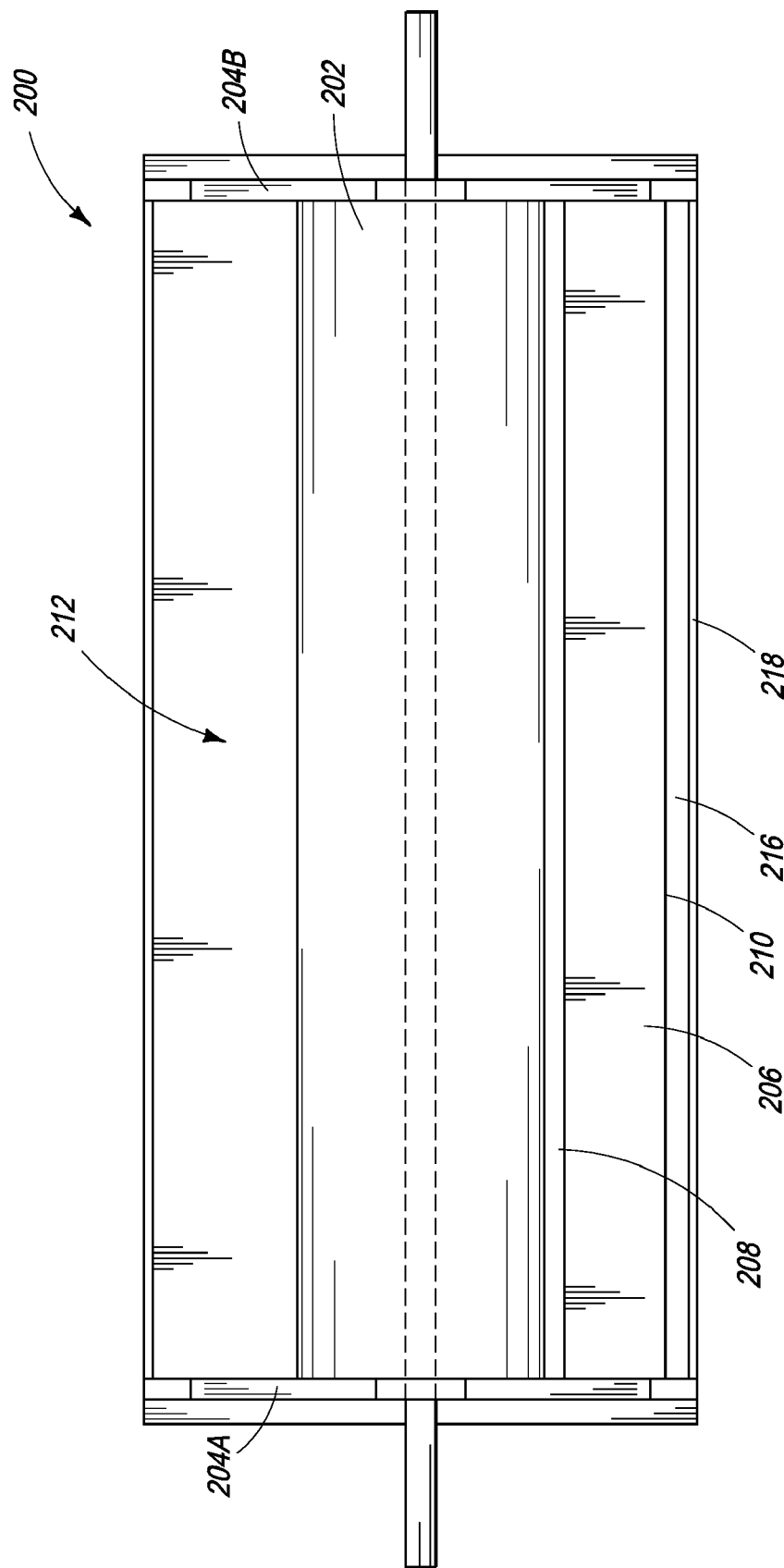
Figure 3A:
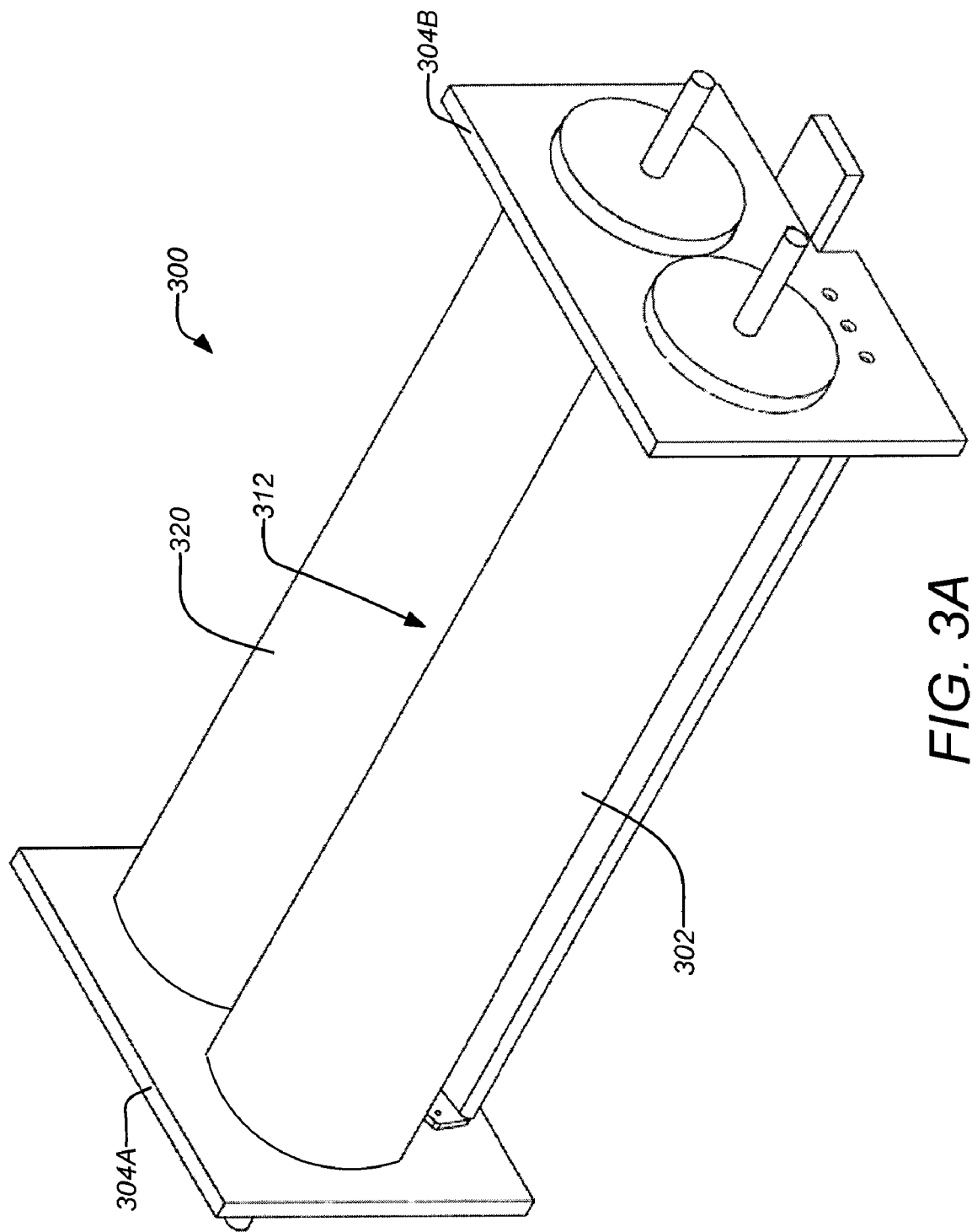
FIGS. 3A-3E illustrate an example embodiment of the invention employing a kick roller and a carrier roller.
Figure 3B:
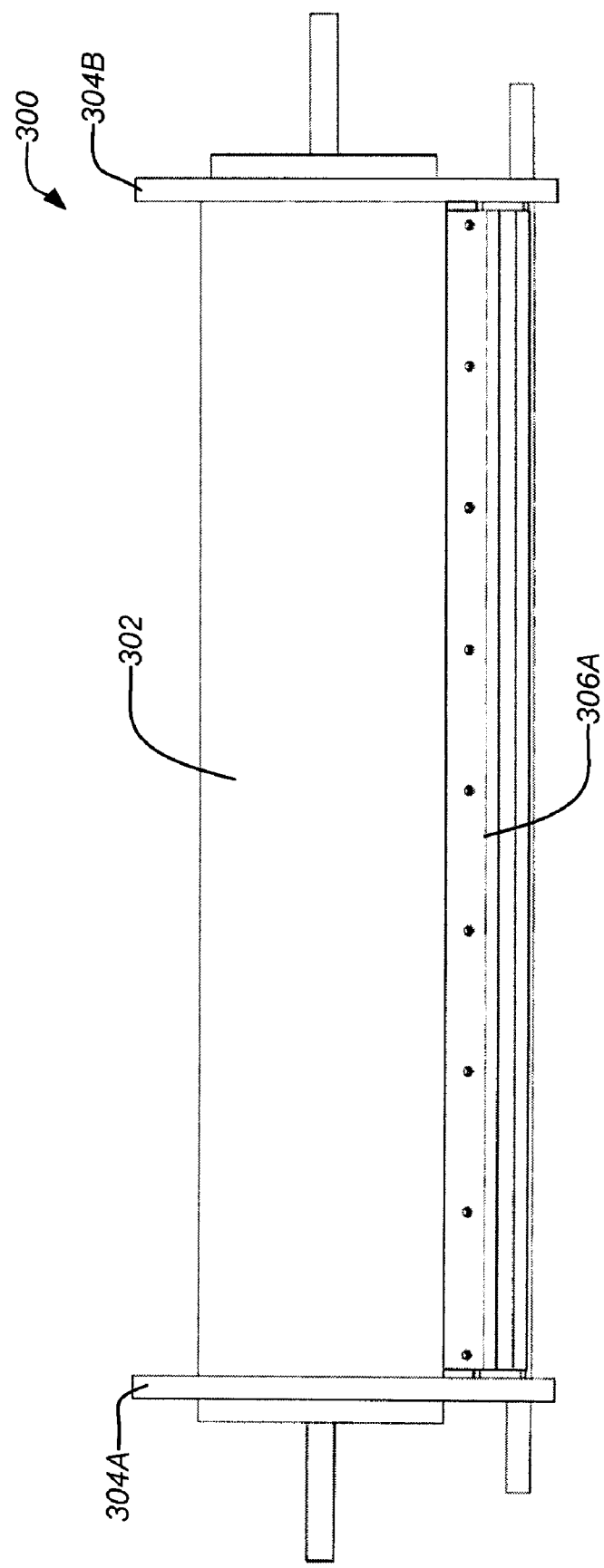
Figure 3C:
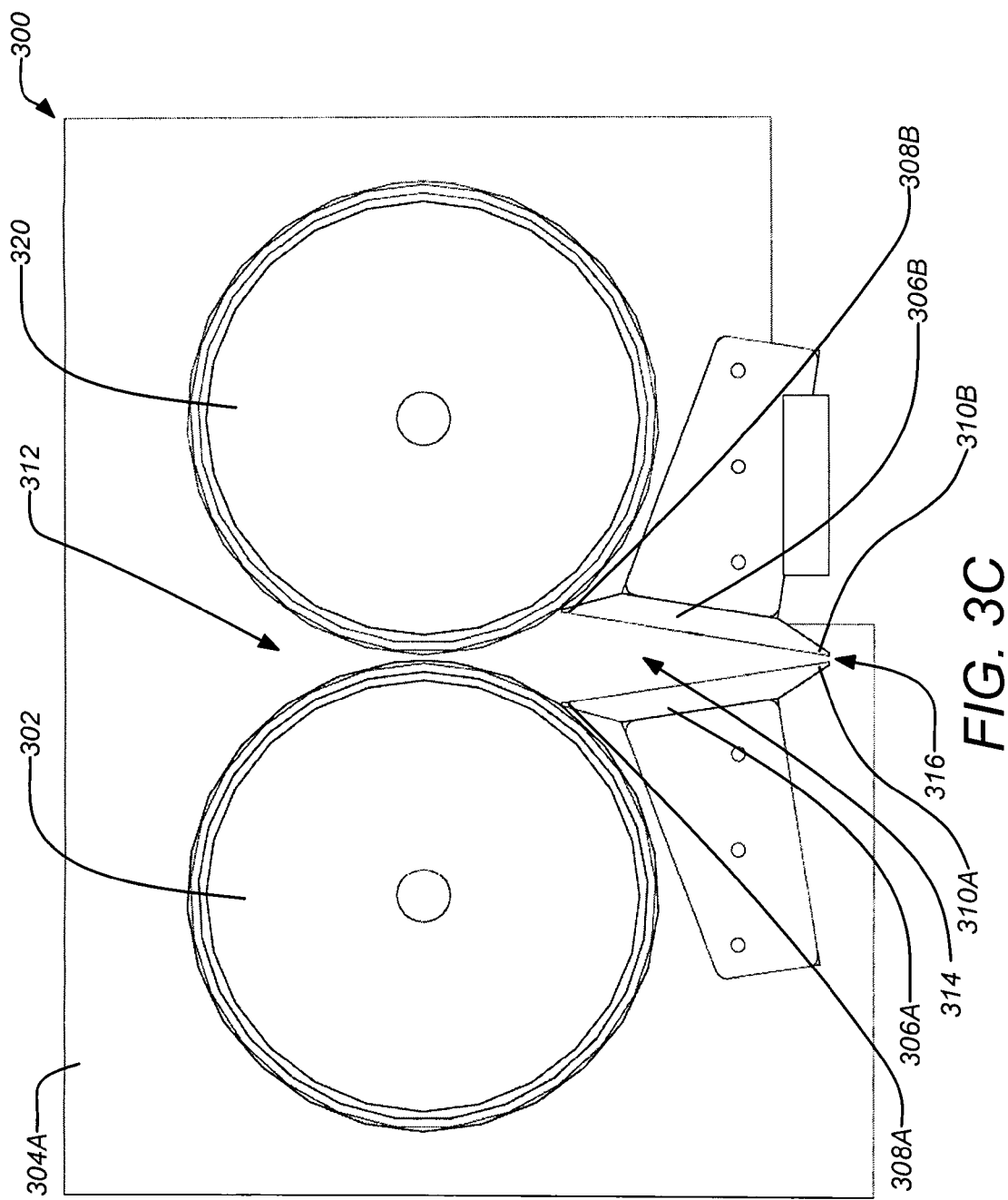
Figure 3D:
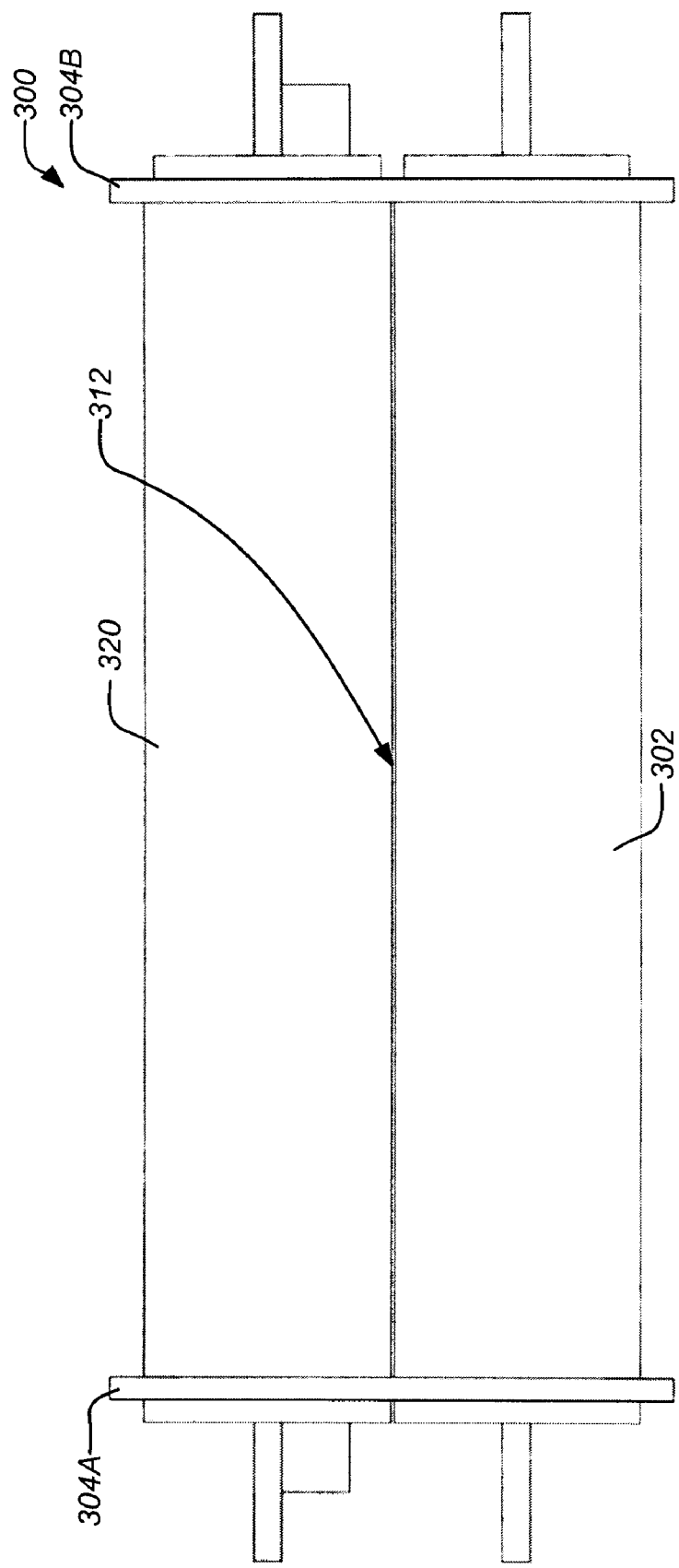
Figure 3E:
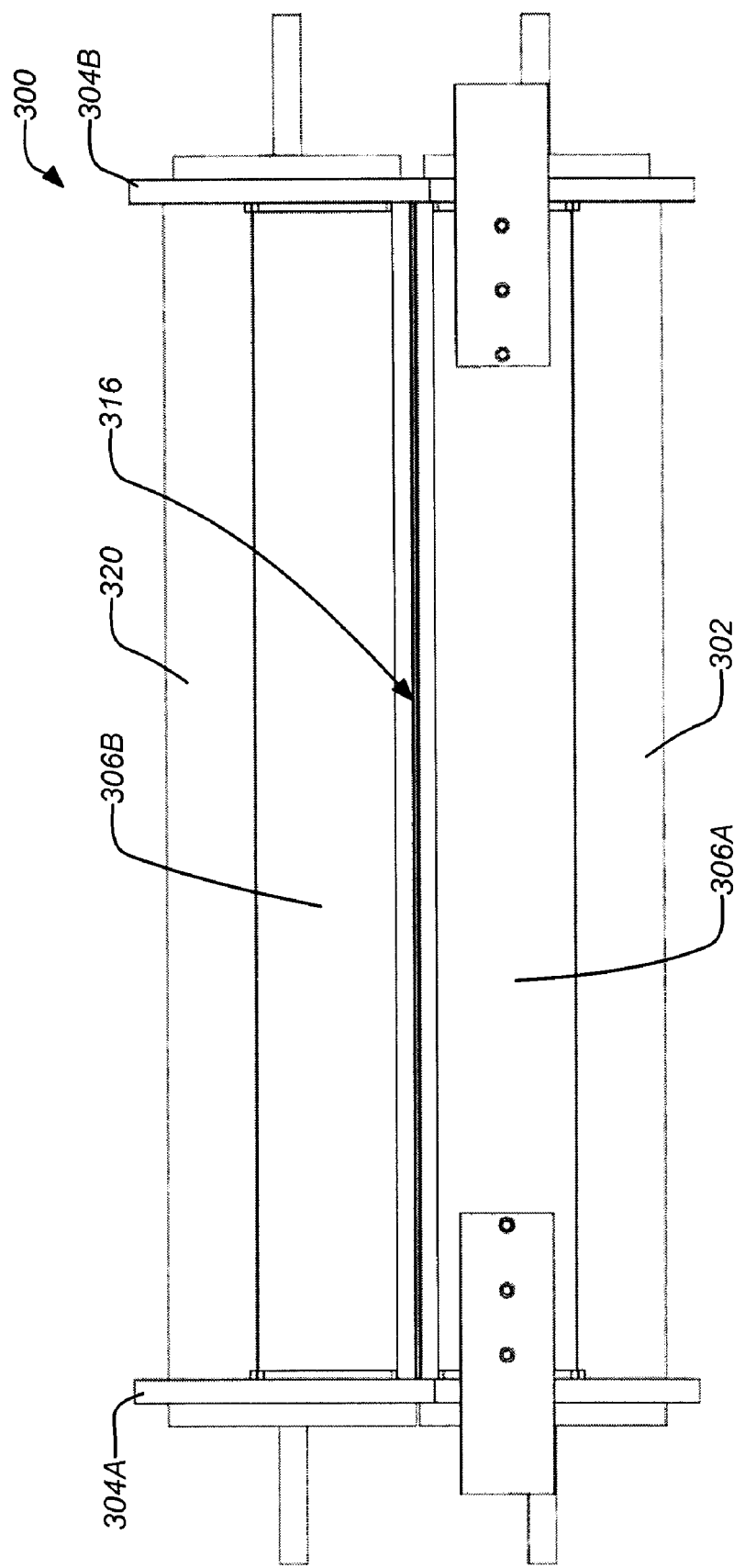
Figure 4A:
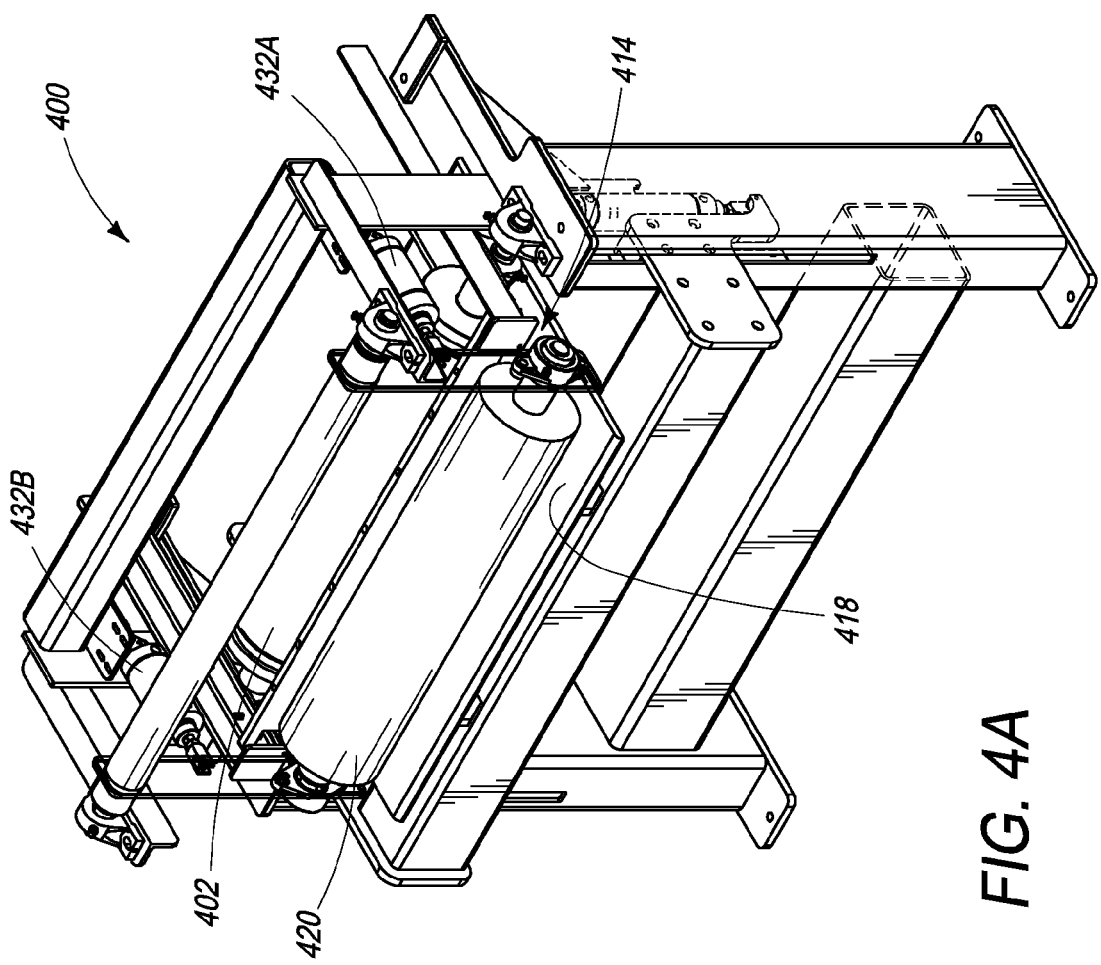
FIGS. 4A-4E illustrate an example embodiment of the invention employing a kick roller and a carrier roller and using a rigid bottom carrier and a flexible top carrier.
Figure 4B:
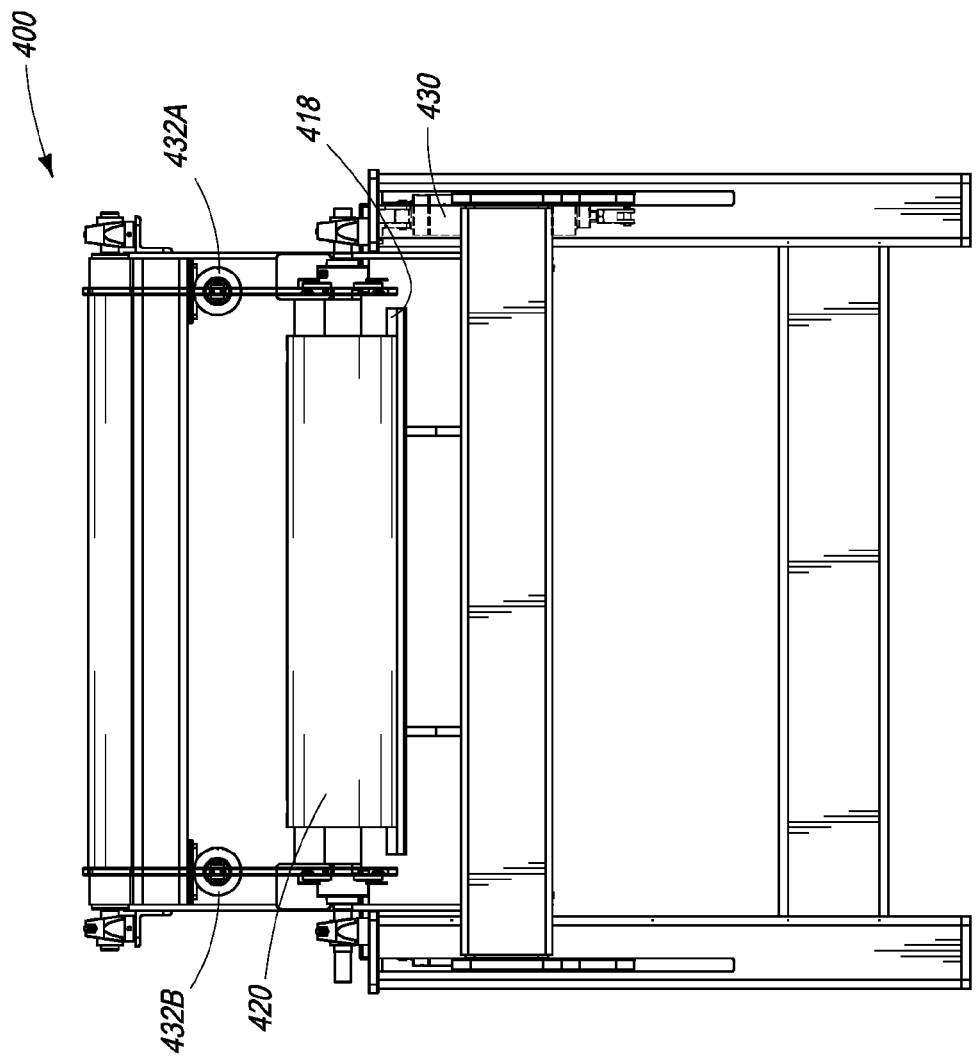
Figure 4C:
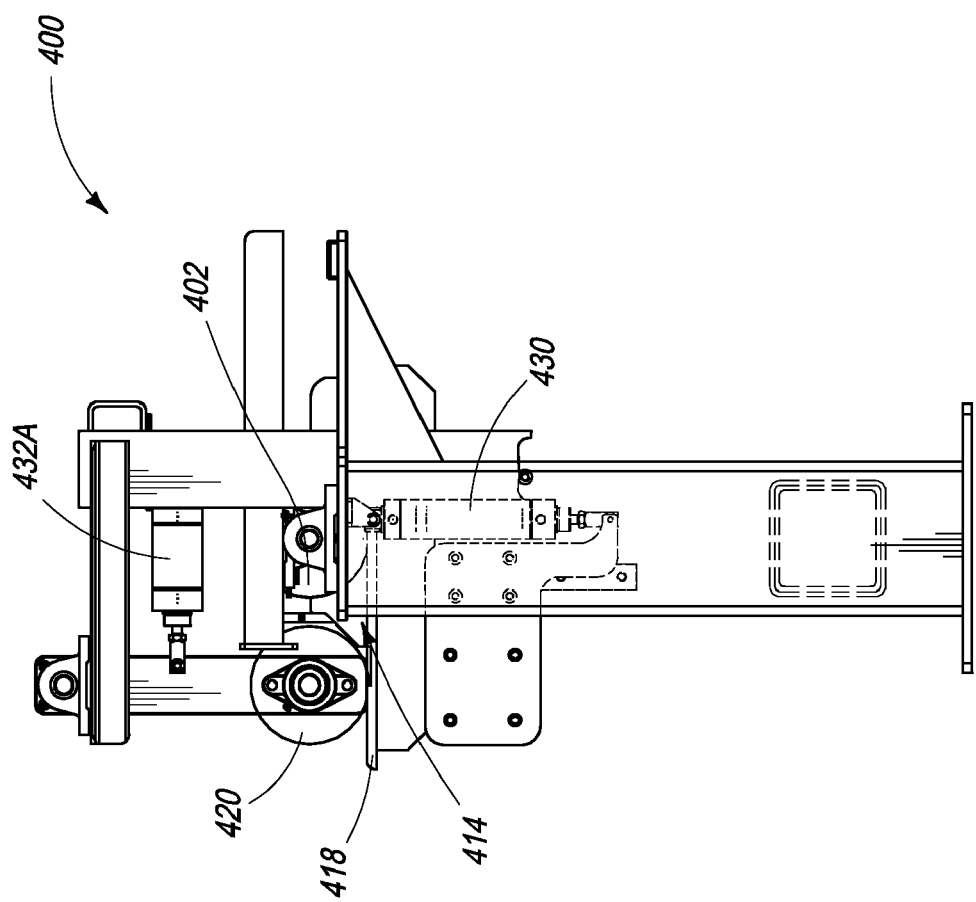
Figure 4D:
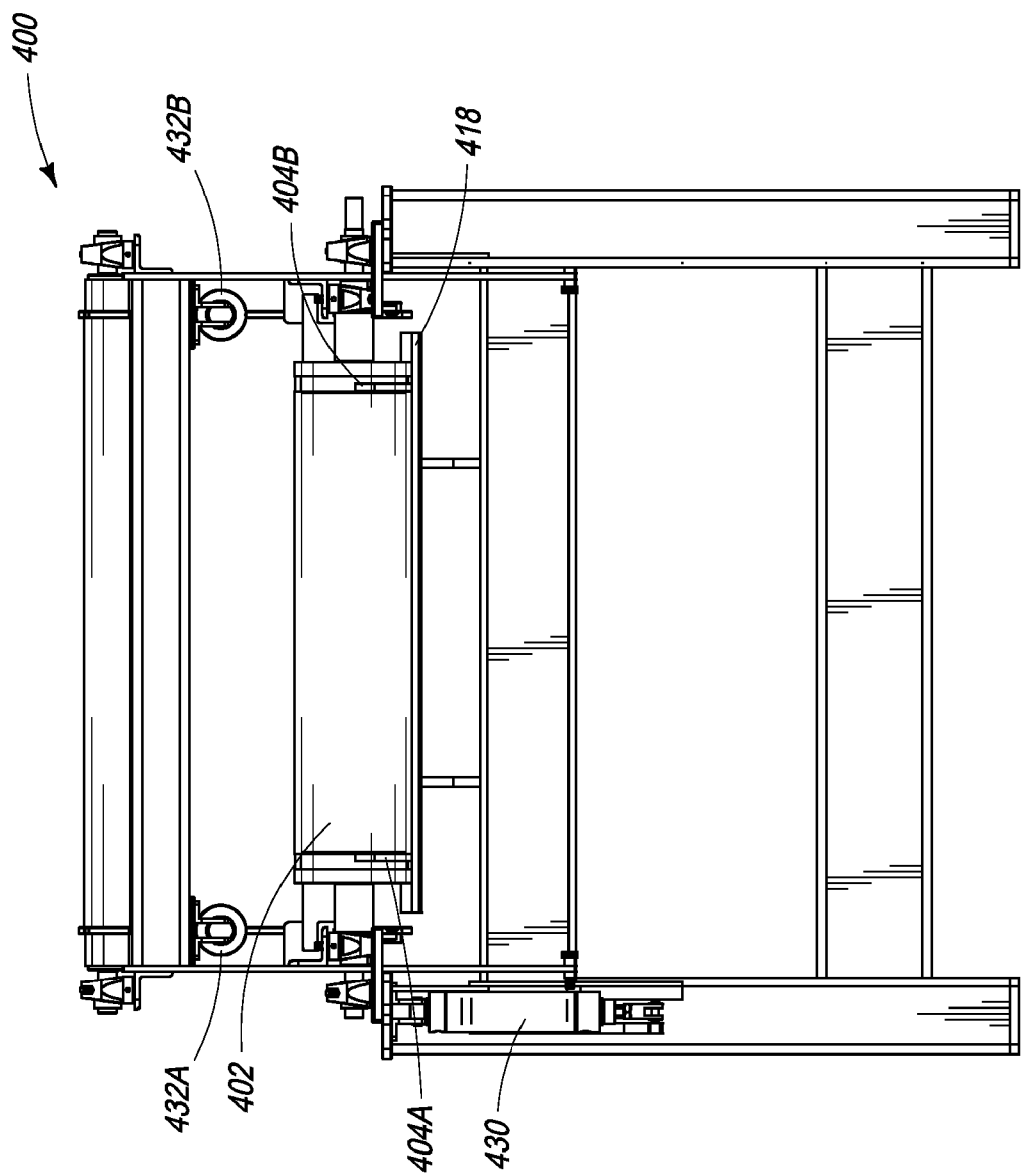
Figure 4E:
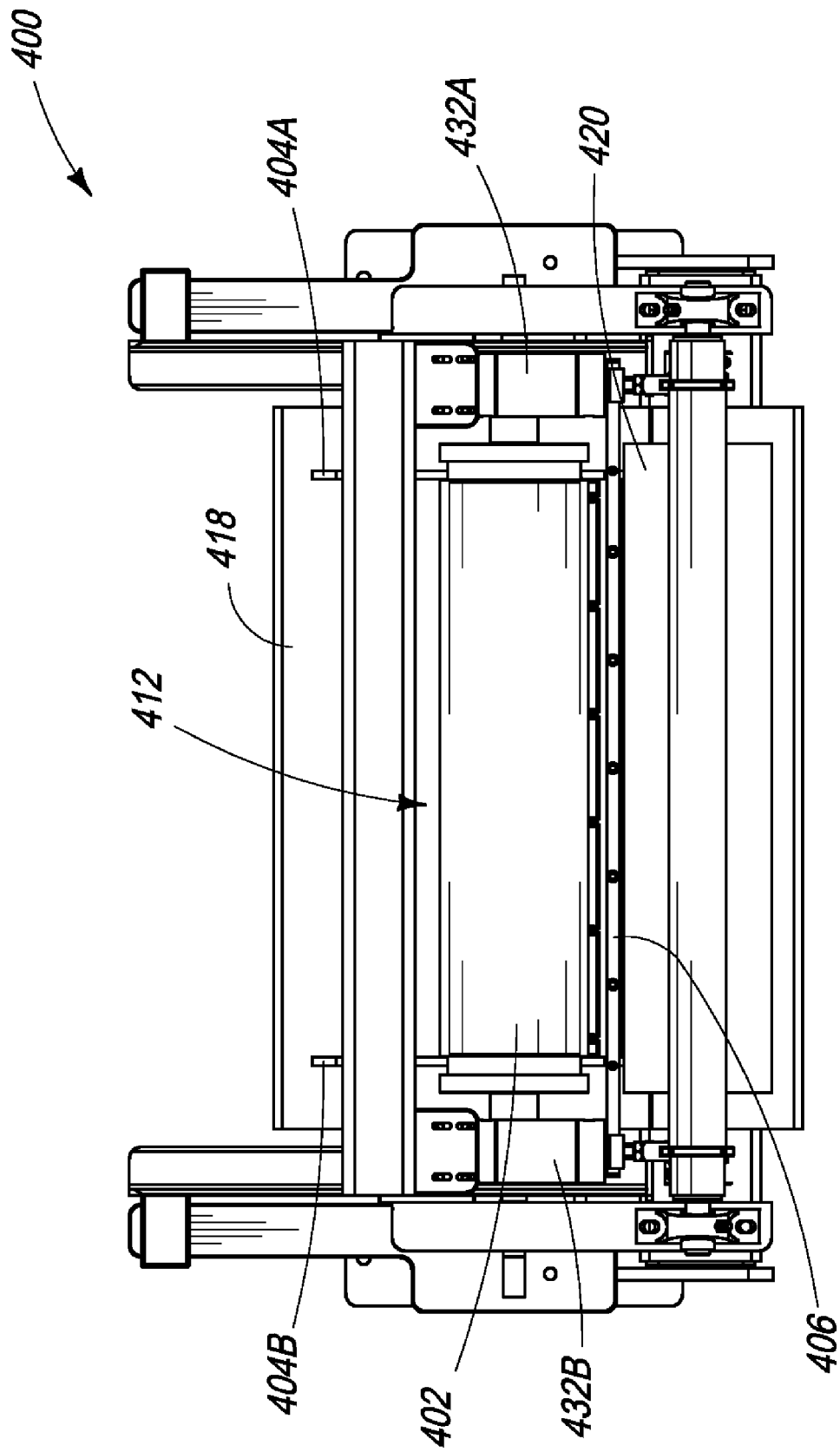

FIGS. 2A-2C illustrates an example embodiment of the invention employing a single kicker roller 202 per Configuration 1. This apparatus 200 is wider version of the apparatus 100 described in FIGS. 1A & 1B. A single kicker roller 202 is employed between side walls 204A, 204B and draws in the resin matrix and charge from the inlet area 212. The pressure zone 214 is formed between the side walls 204A, 204B the blade 206 and the table 218. The blade 206 includes wipers 208, 210 at each edge, against the kicker roller 202 and the outlet area 216, respectively, where the composite is forced out under pressure. The apparatus 200 operates under the principles previously described and may incorporate a top and/or bottom carrier in forming the composite.

FIGS. 3A-3E illustrate another example embodiment of the invention employing a kicker roller 302 and a carrier roller 320 per configuration 9. This apparatus 300 is arranged vertically with the inlet area 312 between the kicker roller 302 and the carrier roller 320 from above. The pressure zone 314 is formed between and below the kicker roller 302 and the carrier roller 320 by blades 306A, 306B below each respective roller. Each blade 306A, 306B includes a wiper 308A, 308B against the respective roller 302, 320 on one edge. On the opposite edge, each blade 306A, 306B has a blade 310A, 310B which for the outlet area 316 for the composite between them.

FIGS. 4A-4E illustrate an example embodiment of the invention employing a kicker roller 402 and a nip roller 420 and using a rigid bottom carrier and a flexible top carrier. This apparatus 400 is an example of Configuration 7 employing single kick roller 402 and producing composite with a rigid bottom carrier and a flexible top carrier. In this apparatus 400 the inlet area 412 is formed with side dams 404A, 404B set in grooves in the kicker roller 402. This inlet area 412 receives the resin matrix and charge for the composite. The nip roller 420 is positioned behind the kicker roller 402 and serves to apply the flexible top carrier over the resin matrix within the pressure zone 414. The rigid bottom carrier is drawn into the inlet area 412 on the table 418. In this apparatus 400, the pressure zone 414 is formed on the table 418, between the kicker roller 402 and the nip roller 420. A blade 406 is positioned between the kicker roller 402 and the nip roller 420 with wipers against each to seal the pressure zone 414. The top carrier may run between the nip roller 420 and the wiper of the blade 406 to enter the pressure zone 414. Alternately, the top carrier may be held on the nip roller 402 and rolled off directly into the pressure zone 414. The kicker roller 402 and the nip roller 420 both rotate in the same direction to move the resin/composite through.

This apparatus 400 also incorporates hydraulic or air cylinders to adjust positioning of the rollers and table for different composites. For example, vertical positioning of the table 418 may be adjusted through cylinder 430. Positioning of the nip roller 420 may be adjusted (e.g., as the top carrier is reeled off) through hydraulic or air cylinders 432A, 432B.

Various embodiments of the invention can improve on the previously described first, second, third and fifth techniques for composite impregnation previously described in the background because air is forcibly excluded from the resin matrix. Thus, the resin matrix, can be more viscous and therefore have higher filler loads, and resin matrix and charge are brought together under pressure. For similar reasons, some embodiments of the invention can also improve on known techniques for manufacturing sheet molding compound (SMC) including a dual-wire-mesh compaction device, and other wire-mesh belt mechanisms and grooved rollers. With the sixth known technique for composite impregnation described in the background above, embodiments of the invention can provide the option of eliminating a carrier film, which can lower production costs. Also, a positive pressure shear impregnator in accordance with an embodiment of the invention can be less expensive to make than a known dual-wire-mesh belt compactor; it is physically smaller and can yield increased productivity. In addition, the fourth technique for composite impregnation described in the background above can be improved on by embodiments of the invention, because that process is typically limited to very thin prepregs and slow production speed. Embodiments of the invention invention can provides improvements in both these areas.

With reference to the de-aeration processes of the second technique for composite prepregnation described in the background above, embodiments of the invention can simplify equipment requirements, particularly under a continuous operation process. In addition, embodiments of the invention can mitigate or eliminate the problems typically associated with solvent boiling of a vacuum system as described above. Embodiments of the invention can also remove a step if it is desired to dispense the liquid in sheet form, such as might be used in film manufacturing.

Embodiments of the invention can be applied to wetting out composites, e.g. as applied to the first, second, third and fifth techniques for composite impregnations described in the background above. These known techniques are all limited by the viscosity of resin that can be wetted out, and the speed at which the composites can be made. Embodiments of the invention can increase the viscosity limit substantially for these processes and enable higher production speeds. In addition, as a result of increasing the viscosity limit, filler loadings can be increased yielding better properties and lower costs. Also products that previously required thinning with solvents can be made without those solvents and without the problems and expense associated with them.

Although the fourth known technique descibed in the background above does not have a severe viscosity limit, it can only be used to make very thin materials and operates at low production speeds. In contrast, embodiments of the invention can enable thicker products and higher rates of production.

The sixth known technique for composite impregnation described in the background above has the limitation that it cannot be used to wet out mat, continuous fibers, or material with carriers films. However, embodiments of the invention should not have such limits, and therefore have a much wider range of applications.

4. Positive Pressure Shear Impregnation Method

Embodiments of the invention also emcompass a method employing the principles of the apparatuses and techniques described above to use a kicker roller to pressurize a resin matrix as it is combined with a fiber charge.

Figure 5:
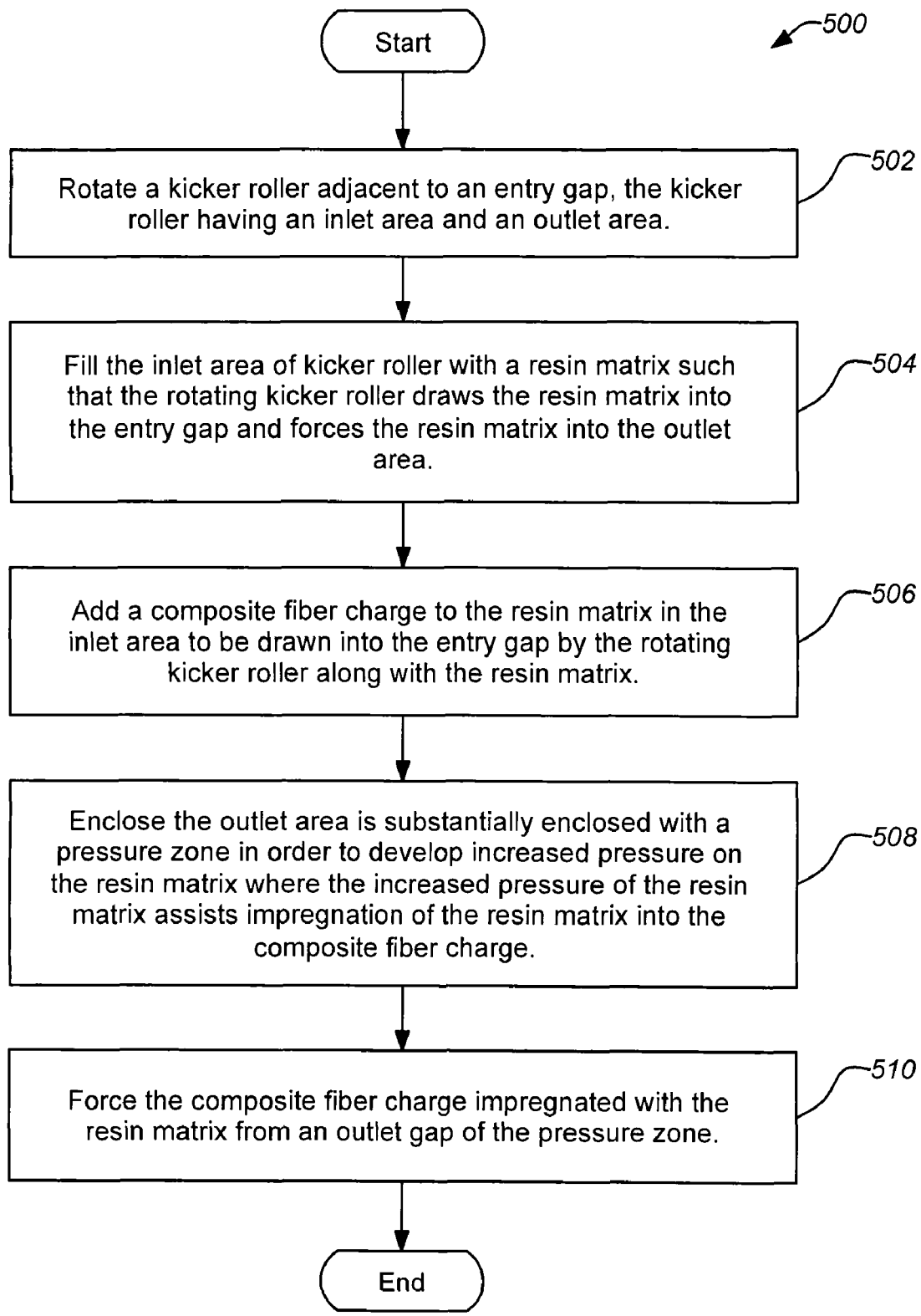
FIG. 5 is a flowchart of an exemplary method of making a composite material in accordance with an embodiment of the invention.

FIG. 5 is a flowchart of an exemplary method 500 of making a composite material in accordance with an embodiment of the invention. The exemplary method 500 of making a composite material begins with an operation 502 of rotating a kicker roller adjacent to an entry gap, the kicker roller having an inlet area and an outlet area. In operation 504, the inlet area of kicker roller is filled with a resin matrix such that the rotating kicker roller draws the resin matrix into the entry gap and forces the resin matrix into the outlet area. In operation 506, a composite fiber charge is added to the resin matrix in the inlet area to be drawn into the entry gap by the rotating kicker roller along with the resin matrix. Next in operation 508, the outlet area is substantially enclosed with a pressure zone in order to develop increased pressure on the resin matrix. Finally in operation 510, the composite fiber charge impregnated with the resin matrix is forced from an outlet gap of the pressure zone. The increased pressure of the resin matrix assists impregnation of the resin matrix into the composite fiber charge.

The method of making a composite material may be further modified consistent with the apparatuses and techniques described herein. For example, the method may be modified to include an operation of rotating a carrier roller in an opposite direction adjacent to the kicker roller and opposite the entry gap. Further, the carrier roller may draw a bottom carrier material to support the resin matrix as it is drawn into the entry gap, impregnated into the composite fiber charge, and output from the outlet gap. Similarly, a top carrier material may be drawn into the pressure chamber to cover the resin matrix as it is extruded out the outlet gap supported by the bottom carrier material.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A method of making a composite material, comprising: rotating a kicker roller driven by a motor adjacent to an entry gap, the kicker roller having an inlet area and an outlet area; filling the inlet area of kicker roller with a resin matrix such that the driven rotating kicker roller draws the resin matrix into the entry gap and forces the resin matrix into the outlet area; adding a composite fiber charge to the resin matrix in the inlet area to be drawn into the entry gap by the rotating kicker roller along with the resin matrix; substantially enclosing the outlet area with at one blade, side walls, and the kicker roller to form a pressure zone in order to develop increased pressure on the resin matrix; and forcing the composite fiber charge impregnated with the resin matrix from an outlet gap of the pressure zone; wherein the increased pressure of the resin matrix assists impregnation of the resin matrix into the composite fiber charge and forms a barrier excluding air.

2. The method of claim 1, further comprising rotating a carrier roller in an opposite direction adjacent to the kicker roller and opposite the entry gap.

3. The method of claim 2, wherein the carrier roller draws a bottom carrier material to support the resin matrix as it is drawn into the entry gap, impregnated into the composite fiber charge, and output from the outlet gap.

4. The method of claim 3, wherein the bottom carrier material is selected from the group consisting of a film, a foil, a paper and a sheet.

5. The method of claim 3, further comprising drawing a top carrier material into the pressure chamber to cover the resin matrix as it is extruded out the outlet gap supported by the bottom carrier material.

6. The method of claim 5, wherein the top carrier material is selected from the group consisting of a film, a foil, a paper and a sheet.

7. The method of claim 1, wherein the resin matrix comprises a solid suspension.

8. The method of claim 1, wherein the composite fiber charge comprises a continuous composite fiber mat.

9. The method of claim 1, wherein the composite fiber charge comprises loose composite fibers.

10. The method of claim 1, wherein the entry gap is formed against a carrier roller.

\* \* \* \* \*